United States Patent
Wu et al.

(10) Patent No.: US 9,924,331 B2
(45) Date of Patent: Mar. 20, 2018

(54) METHOD AND APPARATUS FOR CONTROLLING FEEDBACK INFORMATION

(71) Applicant: Anhui Huami Information Technology Co.,Ltd., Hefei (CN)

(72) Inventors: Haocheng Wu, Hefei (CN); Hui Wang, Hefei (CN)

(73) Assignee: Anhui Huami Information Technology Co., Ltd., Hefei, Anhui (CN)

( * ) Notice: Subject to any disclaimer, the term of this patent is extended or adjusted under 35 U.S.C. 154(b) by 128 days.

(21) Appl. No.: 15/069,452

(22) Filed: Mar. 14, 2016

(65) Prior Publication Data

US 2016/0277902 A1    Sep. 22, 2016

(30) Foreign Application Priority Data

Mar. 16, 2015   (CN) .......................... 2015 1 0113994

(51) Int. Cl.
*H04W 4/06* (2009.01)
*H04W 4/00* (2018.01)
(Continued)

(52) U.S. Cl.
CPC ........... *H04W 4/06* (2013.01); *H04M 1/7253* (2013.01); *H04M 1/72577* (2013.01);
(Continued)

(58) Field of Classification Search
CPC ......... H04W 4/06; H04W 4/008; H04W 4/16; H04W 4/027; H04W 4/028;
(Continued)

(56) References Cited

U.S. PATENT DOCUMENTS

2006/0114920 A1* 6/2006 Jung ...................... H04L 67/36
370/410
2007/0238411 A1* 10/2007 House ................ H04M 1/6066
455/41.2
(Continued)

FOREIGN PATENT DOCUMENTS

CN      101415154 A    4/2009
CN      103533171 A    1/2014
(Continued)

*Primary Examiner* — Peter Chau
(74) *Attorney, Agent, or Firm* — Young Basile Hanlon & MacFarlane, P.C.

(57) ABSTRACT

Methods and apparatuses for providing feedback information to a second terminal, to avoid disturbance of data directed to a user associated with a first terminal. The method includes receiving data directed to the user associated with the first terminal, transmitting a request for a current status of the user to the wearable device, receiving broadcast packets, wherein the broadcast packets comprises an identifier of the wearable device and the current status of the user, based on the identifier of the wearable device, determining whether the wearable device has been paired with the first terminal, and if so, executing, at the first terminal, at least one feedback operation directed to the second terminal using the current status of the user to indicate the current status of the user.

7 Claims, 5 Drawing Sheets

(51) Int. Cl.
*H04M 3/42* (2006.01)
*H04W 4/16* (2009.01)
*H04W 4/02* (2018.01)
*H04M 1/725* (2006.01)
*H04M 1/64* (2006.01)

(52) U.S. Cl.
CPC ....... *H04M 3/42365* (2013.01); *H04W 4/008* (2013.01); *H04W 4/027* (2013.01); *H04W 4/028* (2013.01); *H04W 4/16* (2013.01); *H04M 1/645* (2013.01); *H04M 2250/02* (2013.01); *H04M 2250/12* (2013.01); *H04M 2250/60* (2013.01)

(58) Field of Classification Search
CPC ........... H04M 3/42365; H04M 1/7253; H04M 1/72577; H04M 2250/02; H04M 2250/60; H04M 1/645; H04M 2250/12
See application file for complete search history.

(56) References Cited

U.S. PATENT DOCUMENTS

| | | | |
|---|---|---|---|
| 2008/0220718 A1* | 9/2008 | Sakamoto | H04B 1/385 455/41.2 |
| 2014/0087700 A1* | 3/2014 | Gudlavenkatasiva | H04W 4/16 455/413 |
| 2014/0342762 A1* | 11/2014 | Hajdu | H04M 1/72552 455/466 |
| 2015/0062022 A1* | 3/2015 | Rabii | G06T 1/20 345/173 |
| 2015/0341901 A1* | 11/2015 | Ryu | H04M 1/72569 455/458 |
| 2015/0341902 A1* | 11/2015 | Ryu | H04M 1/725 455/458 |

FOREIGN PATENT DOCUMENTS

| | | |
|---|---|---|
| CN | 104092830 A | 10/2014 |
| JP | 2008271380 A | 11/2008 |

\* cited by examiner

METHOD AND APPARATUS FOR CONTROLLING FEEDBACK INFORMATION

CROSS-REFERENCE TO RELATED APPLICATION

This application claims priority to Chinese patent application no. CN 201510113994.2, filed on Mar. 16, 2015, which is incorporated in this disclosure in its entirety by reference.

TECHNICAL FIELD

The present disclosure generally relates to communication, and more particularly, to methods and apparatuses for providing feedback information between terminal devices using user status information associated with a wearable device.

BACKGROUND

A terminal device (e.g., a cell phone) often has multiple working modes. For example, when a "Do-Not-Disturb" mode is switched on, a cell phone of a user keeps muted or silent upon receiving a phone call or a message. In this mode, the user cannot see an unanswered call or an unread message until checking on the cell phone, while a person who makes the call hears the same voice message as in a normal calling scenario, and a person who sends the message receives the same feedback (or no feedback) as in a normal messaging scenario. In another example, when an "Airplane" mode is switched on, the cell phone is disconnected from a network. In this mode, the user cannot receive any phone call or message, while a person who makes a call hears a busy signal or a feedback indicative of unable to connect to the user, and a person who sends a message receives the same feedback (or no feedback) as in a normal messaging scenario.

A user often has to manually switch between working modes of the cell phone, and the person who makes the call (or the person who sends the message) often receives incomplete information. For example, when the called user switched to the "Do-Not-Disturb" mode, the dialer is often unaware of the situation and repeatedly calling the user. When in an emergency, the called user often cannot be reached by others if the "Do-Not-Disturb" mode or the "airplane" mode is in use.

SUMMARY

Disclosed in this disclosure are implementations of methods and apparatuses for providing feedback information.

In one aspect, the present disclosure includes a method for providing feedback information, using a first terminal and a user status associated with a wearable device, comprising receiving, from a second terminal, data directed to a user associated with the first terminal, transmitting, by the first terminal, a request for a current status of the user to the wearable device, receiving, from the wearable device, at least one broadcast packet, wherein the at least one broadcast packet comprises an identifier of the wearable device and the current status of the user, based on the identifier of the wearable device, determining whether the wearable device has been paired with the first terminal, and based on a determination that the wearable device has been paired with the first terminal, executing, at the first terminal, at least one feedback operation directed to the second terminal using the current status of the user.

In one aspect, the present disclosure includes a method for providing feedback information using a wearable device, comprising determining, by the wearable device, a current status of a user, receiving, from a first terminal, a request for the current status of the user, and transmitting, to the first terminal, at least one broadcast packet, wherein the at least one broadcast packet comprises an identifier of the wearable device and the current status of the user.

In another aspect, the present disclosure includes an apparatus for providing feedback information, comprising a monitor module configured to determine a current status of a user, a reception module configured to receive a request for the current status of the user from a first terminal, and a transmission module configured to transmit at least one broadcast packet to the first terminal, wherein the at least one broadcast packet comprises an identifier of the apparatus and the current status of the user.

In another aspect, the present disclosure includes an apparatus for providing feedback information, using a user status from a wearable device, comprising a first reception module configured to receive data directed to a user associated with the apparatus from a first terminal, a request module configured to transmit a request for a current status of the user to the wearable device, a second reception module configured to receive at least one broadcast packet from the wearable device, wherein the at least one broadcast packet comprises an identifier of the wearable device and the current status of the user, a determination module configured to, based on the identifier of the wearable device, determine whether the wearable device has been paired with the apparatus, and a feedback module configured to, based on a determination that the wearable device has been paired with the apparatus, execute at least one feedback operation directed to the first terminal using the current status of the user.

The embodiments or implementations can be configured as executable computer program instructions stored in computer storages such as memory.

BRIEF DESCRIPTION OF THE DRAWINGS

The description here makes reference to the accompanying drawings wherein like reference numerals refer to like parts throughout the several views, and where.

DETAILED DESCRIPTION

Example implementations of the present disclosure will be described below with reference to the accompanying drawings. The same numbers across the drawings set forth in the following description represent the same or similar elements, unless differently expressed. The implementations set forth in the following description do not represent all implementations or embodiments consistent with the present disclosure; on the contrary, they are only examples of apparatuses and methods in accordance with some aspects of this disclosure as detailed in the claims.

Figure 1:
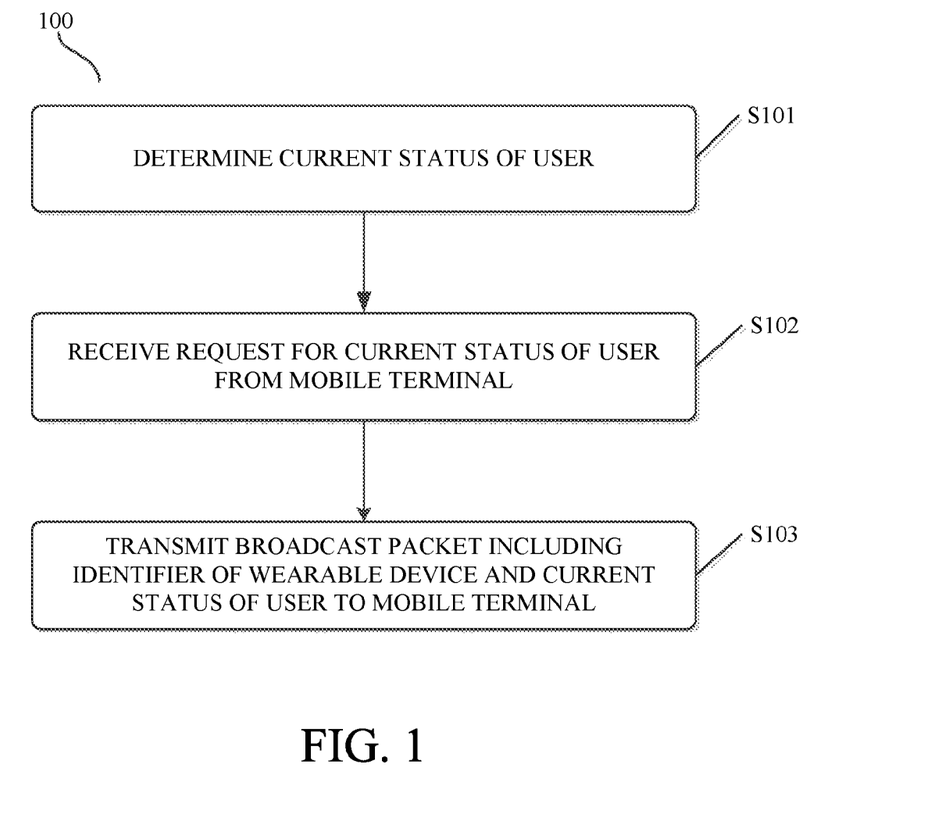
FIG. 1 is a flowchart of an example method for providing feedback information according to implementations of this disclosure.

FIG. 1 is a flowchart of an example method for providing feedback information according to implementations of this disclosure. The method can be used at a wearable device. The wearable device in this disclosure can be a "smart" wearable device incorporated with computer or electronic components. For example, the wearable device can be an apparatus that can be worn at a portion of a human body, such as a wristband, a watch, a ring, a necklace, a clip, a waistband, eyewear, a head-mounted display, or any other portable apparatus configured to be carried or worn by an individual, such as a key fob. As shown in FIG. 1, the method includes operations S101-S103 set forth in the following description.

At operation S101, a current status of a user is determined. Determining in this disclosure can include, for example, monitoring, obtaining, receiving, deciding, accessing, acquiring, retrieving, inputting, reading or in any manner determining the current status of the user. In some implementations, one or more sensors of the wearable device, such as an accelerometer or a gyroscope, can generate data associated with a motion of the user, based on which the current status of the user can be identified, for example, the status can be driving, sleeping, exercising, and so forth.

In some implementations, operation S101 can include operations X and Y.

At operation X, a movement trajectory of the wearable device is monitored. For example, the movement trajectory can include, for example, one or more movement status, one or more of recorded movements, or a collection of movement history of the user detected by the wearable device.

For example, the user is wearing the wearable device (e.g., a smart wristband). When the user is sleeping, the smart wristband can accordingly monitor its movement trajectory, for example, the movement trajectory can be a stationary state with occasional movements. As a result, a sleep status of the user can be determined based on the foregoing movement trajectory of the smart wristband.

At operation Y, based on the movement trajectory of the wearable device, the current status of the user is determined. In some implementations, operation Y can include operations A and B.

At operation A, an acceleration of the wearable device is monitored, with a predetermined frequency.

For example, one or more sensors of the wearable device can monitor and generate acceleration data of the wearable device along directions of three axes with the predetermined frequency (e.g., once in an interval of time), based on which the status of the user can be determined.

At operation B, based on the monitored acceleration of the wearable device, the current status of the user is determined.

For example, based on the acceleration data generated in operation A, a processor of the wearable device can identify the status of the user, such as sleeping or driving. In some implementations, the status of the user can be converted to one or more instructions of status for user to query.

At operation S102, a request for the current status of the user is received from a first terminal.

For example, when a calling terminal sends a phone call or a message to the first terminal (e.g., mobile terminal), the first terminal can send the request to the wearable device to query and obtain information of the current status of the user. A second terminal (also referred to as "calling terminal") in this disclosure is defined as a terminal device (e.g., a cell phone) that initiates to establish a connection (e.g., to make a phone call or to send a message) to the first terminal (also referred to as "called terminal"). The first terminal ("called terminal") is defined in this disclosure accordingly as another terminal device that receives data about the connection initiated from the calling terminal. Receiving is defined in this disclosure as receiving, inputting, acquiring, retrieving, obtaining, reading, accessing, determining, or in any manner inputting data (e.g., the request for the current status of the user).

At operation S103, at least one broadcast packet is transmitted to the first terminal, wherein the at least one broadcast packet comprises an identifier of the wearable device and the current status of the user. The transmitting in this disclosure can be performed via one or more communication networks or connections of any suitable type in any combination, including connections using Bluetooth communications, infrared communications, near field connections (NFC), wireless networks, wired networks, local area networks (LAN), wide area networks (WAN), cellular data networks and the Internet. The broadcast packet in this disclosure is accordingly defined as a unit (e.g., a packet) of data that is generated purporting to transmit data via the foregoing one or more communication networks or connections.

For example, in response to receiving the request from the first terminal, the wearable device can generate the at least one broadcast packet, which can include the identifier of the wearable device and the current status of the user. In some implementations, the identifier of the wearable device can be used to pair the wearable device to the first terminal.

In some implementations, operation S103 can include operation M.

At operation M, the at least one broadcast packet is transmitted to the first terminal, wherein the at least one broadcast packet comprises an identification code of the wearable device and a code of the current status of the user. For example, the identification code of the wearable device can indicate the identifier of the wearable device, and the code of the status can indicate the current status of the user. In some implementations, the at least one broadcast packet can be transmitted to the first terminal via Bluetooth.

Figure 2:
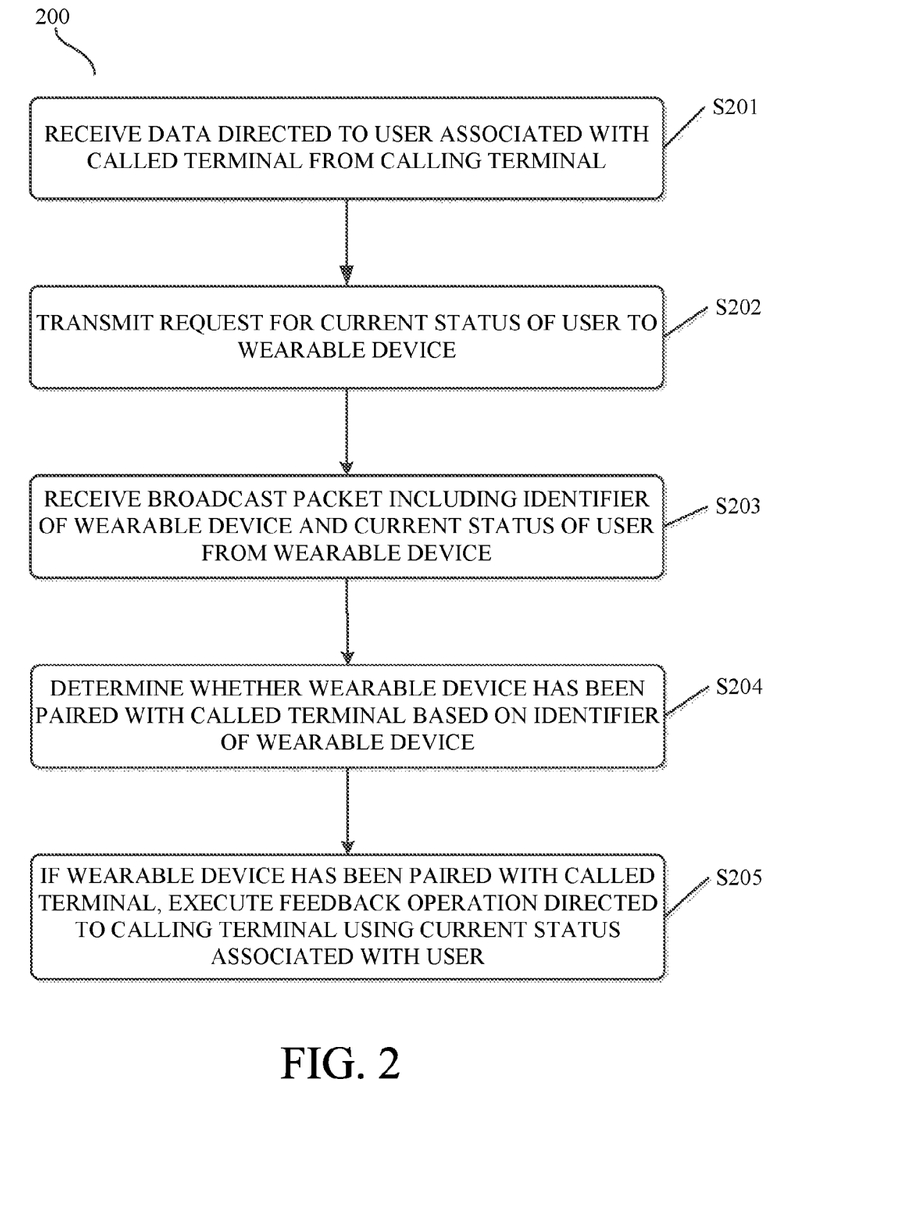
FIG. 2 is a flowchart of another example method for providing feedback information according to implementations of this disclosure.

FIG. 2 is a flowchart of another example method for providing feedback information according to implementations of this disclosure. The method can be used at a first terminal. The first terminal can be, for example, a cell phone or a terminal device for receiving and sending messages. In some implementations, the first terminal can be a called terminal as defined in the foregoing description. As shown in FIG. 2, the method can include operations S201-S205.

At operation S201, data directed to a user associated with the called terminal is received from a second terminal. In some implementations, the second terminal can be a calling terminal as defined in the foregoing description.

In some implementations, operation S201 can be any one of the following operations.

The first operation: a phone call is received from the calling terminal.

The second operation: a message is received from the calling terminal.

At operation S202, a request for a current status of a user is transmitted to a wearable device.

In some implementations, the wearable device can store a code of the current status of the user. For example, in response to receiving the phone call or the message from the calling terminal, the called terminal can transmit the request for the current status of the user to the wearable device; and based on the obtained current status of the user, the called terminal can provide feedback information to the calling terminal.

At operation S203, at least one broadcast packet is received from the wearable device, wherein the at least one broadcast packet comprises an identifier of the wearable device and the current status of the user.

In some implementations, in response to receiving the request from the called terminal, the wearable device can receive the code of the current status of the user, and generate at least one broadcast packet which can include an identification code of the wearable device and the code of the current status of the user. The at least one broadcast packet, for example, can be transmitted to the called terminal, and in response to receiving the at least one broadcast packet, the called terminal can analyze the at least one broadcast packet to obtain the identification code of the wearable device and the code of the current status of the user. In some implementations, the at least one broadcast packet can be received via Bluetooth.

At operation S204, based on the identifier of the wearable device, it is determined whether the wearable device has been paired with the called terminal.

For example, a terminal device can be associated with a unique identification code. In some implementations, the wearable device can be previously paired with the called terminal. At this operation, for example, it can be verified whether the wearable device is a wearable device that has been previously paired with the called terminal.

At operation S205, based on a determination that the wearable device has been paired with the called terminal, at least one feedback operation is executed directed to the calling terminal using the current status associated with the user. The feedback operation can include an operation for indication. The operation for indication in this disclosure can be any visual, acoustic, or haptic indication, or any suitable type of indication in any combination, including a message, an icon, a change in user interface, an LED indication, a ringtone, a voice, and a vibration.

In some implementations, operation S205 can include operation I, II, and III.

At operation I, if the wearable device has been paired with the called terminal, it is determined whether the current status of the user is indicative of a Do-Not-Disturb (DND) status. The DND status can be, for example, a sleeping status of the user.

At operation II, if the current status of the user is indicative of the DND status and if the data directed to the user associated with the called terminal has been received from the calling terminal for a first predetermined number of times (e.g., N1 times), an indication of having received the data directed to the user associated with the called terminal is withheld, and data indicative of the DND status is transmitted to the calling terminal, wherein the data indicative of the DND status comprises data indicative of the current status of the user. If the current status of the user is indicative of the DND status and if the data directed to the user associated with the called terminal is received from the calling terminal for a second predetermined number of times (e.g., N2 times) within a predetermined interval, the indication of having received the data directed to the user associated with the called terminal is generated. N1 and N2 can be any number, and the predetermined number of times can be adjusted over time.

For example, if the current status of the user is indicative of the DND status, the data directed to the user associated with the called terminal (e.g., the phone call or the message) received from the calling terminal for the first predetermined number of times (e.g., for the first time) can be withheld to be indicated at the called terminal. For example, the called terminal can be set into a muted or silent state, in which the received phone call or message is not indicated to the called user. In some implementations, the data indicative of the DND status is transmitted or fed back to the calling terminal, in which the data indicative of the DND status can include data indicative of the current status of the user, for example, a voice or a message of "the user you are dialing is in sleep, please dial later." In those implementations, if a calling person is notified that the called user is in sleep, the calling person, without an emergency, will not call the called user in a short time. In some implementations, if it is an emergency, the calling person will call the called user again, in which case the called terminal can determine whether the data directed to the user associated with the called terminal (e.g., the phone call or the message) is received from the calling terminal for the second predetermined number of times (e.g., for the second time or more times) within the predetermined interval; if that is the case, the receiving of the data directed to the user associated with the called terminal can be indicated at the called terminal by, for example, a ringtone or a vibration. In those implementations of operation II, the called user can avoid disturbance but not miss important matter or issues.

At operation III, if the current status of the user is not indicative of the DND status, the indication of having received the data directed to the user associated with the called terminal is transmitted to the calling terminal.

For example, if the current status of the user is not indicative of the DND status, such as not in driving or sleeping, but rather a normal status indicative of capable to pick up the phone call at any time, the called terminal can indicate the data directed to the user associated with the called terminal (e.g., the phone call or the message) received from the calling terminal as in a normal scenario.

According to implementations of methods for providing feedback information in this disclosure, a wearable device can determine a current status of a user. In response to receiving data directed to the user associated with the called terminal from a calling terminal, a called terminal can transmit a request for the current status of the user to the wearable device; and based on the current status of the user, the called terminal can trigger to execute at least one feedback operation at the calling terminal. In those implementations, the user can avoid disturbance from the data directed to the user associated with the first terminal, and information can be fed back to the calling terminal to indicate the current status of the user, by which user experience can be improved.

In the following description, two implementations are set forth as examples of the foregoing method described in this disclosure.

In the first example implementation, the method for providing feedback information can be implemented at a wearable device. The wearable device can be, for example, a "smart" wristband. In some implementations, a called terminal and a calling terminal can be, for example, two cell phones.

Figure 3:
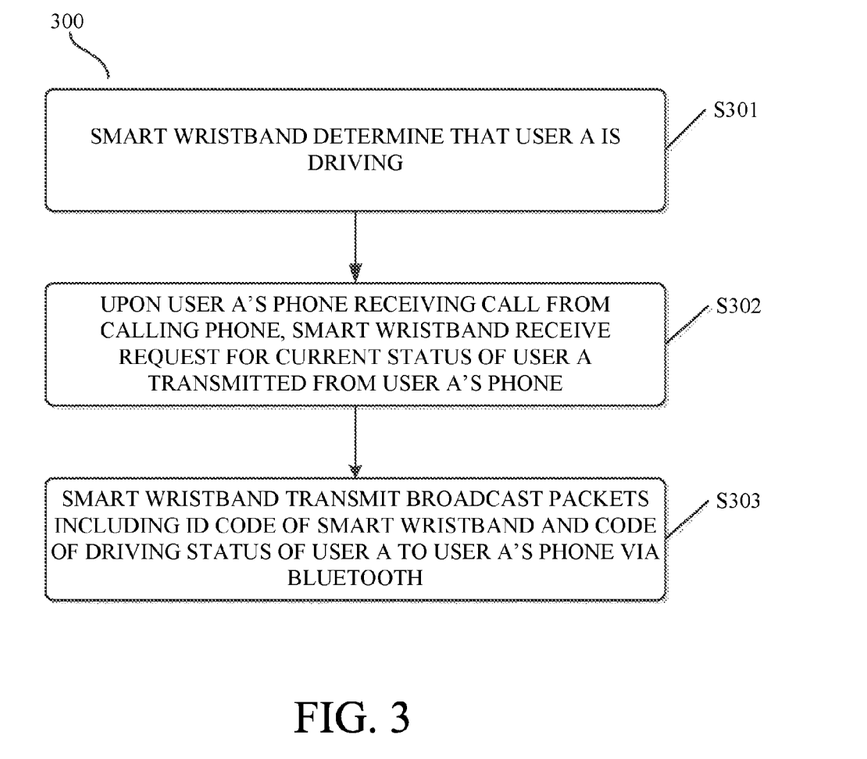
FIG. 3 is a flowchart of another example method for providing feedback information according to implementations of this disclosure.

In some implementations, for example, user A wearing the smart wristband is driving a car. As shown in FIG. 3, the smart wristband can include operations as set forth in the following description.

At operation S301, the smart wristband determines that user A is driving.

At operation S302, when user A's cell phone receives a call from a calling cell phone, the smart wristband receives a request for a status associated with user A transmitted from user A's cell phone.

At operation S303, the smart wristband transmits broadcast packets to user A's cell phone via Bluetooth, wherein the broadcast packets include an identification code of the smart wristband and a code of the driving status associated with user A.

In the first example implementation, the smart wristband can determine the current status of the user, and provide a query service for the called terminal, therefore the user of the called terminal can avoid disturbance from the call, and information based on different statuses associated with the user can be fed back to the calling terminal, by which user experience can be improved.

In the second example implementation, the method for providing feedback information can be implemented at a first terminal ("called terminal"). In some implementations, a wearable device can be, for example, a "smart" wristband. The first terminal and a second terminal ("calling terminal") can be, for example, two cell phones.

Figure 4:
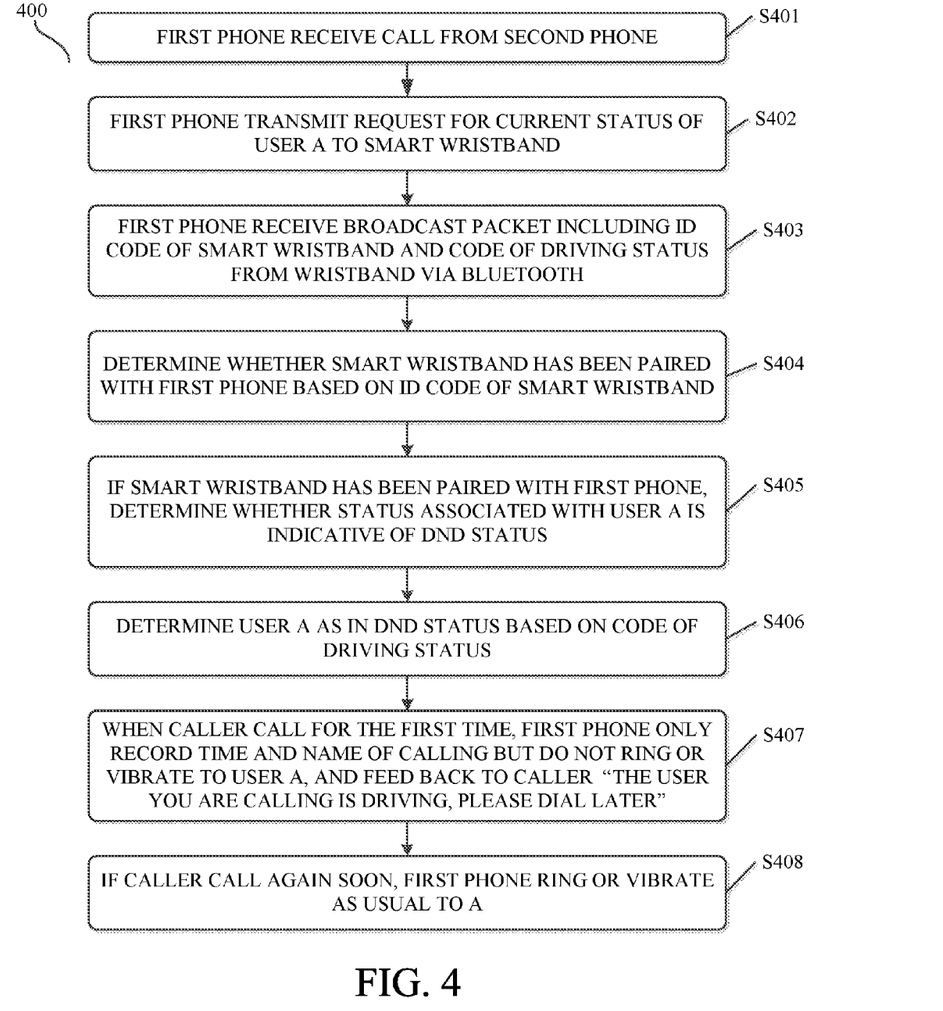
FIG. 4 is a flowchart of another example method for providing feedback information according to implementations of this disclosure.

In some implementations, for example, user A wearing the smart wristband is driving a car. As shown in FIG. 4, the first cell phone can include operations as set forth in the following description.

At operation S401, the first cell phone receives a call from a second cell phone.

At operation S402, the first cell phone transmits a request for a status associated with user A to the smart wristband.

At operation S403, the first cell phone receives broadcast packets from the smart wristband via Bluetooth, wherein the broadcast packets include an identification code of the smart wristband and a code of the driving status associated with user A.

At operation S404, based on the identification code of the smart wristband, it is determined whether the smart wristband has been paired with the first cell phone.

At operation S405, if the smart wristband has been paired with the first cell phone, it is determined whether the status associated with user A is indicative of a DND status.

At operation S406, based on the code of the driving status associated with user A, user A is determined as in a status indicative of the DND status.

At operation S407, when the second cell phone calls the first cell phone for the first time, the first cell phone only records information of the second cell phone (e.g., a time of calling, a name, etc.) and does not ring or vibrate to indicate to user A, as well as provide feedback information to the second cell phone, for example, a voice or a message of "the user you are calling is driving, please dial later."

At operation S408, if the second cell phone calls the first cell phone again within a short period of time, the first cell phone rings or vibrates as in a normal scenario to indicate to user A.

In the second example implementation, based on the driving current status of the user, information can be fed back to the second cell phone to avoid potential safety hazard as a result of using a cell phone during driving. Also, if it is about an important issue, a calling person can repeatedly call the user, in which case the called user can pick up the call from the calling person to avoid missing the important issue, by which user experience can be improved.

Figure 5:
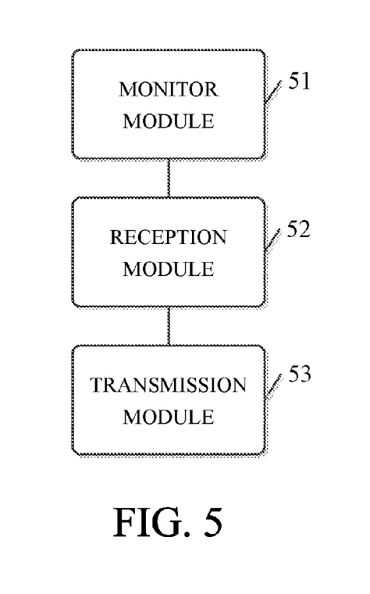
FIG. 5 is a diagram of an example apparatus for providing feedback information according to implementations of this disclosure.
Figure 6:
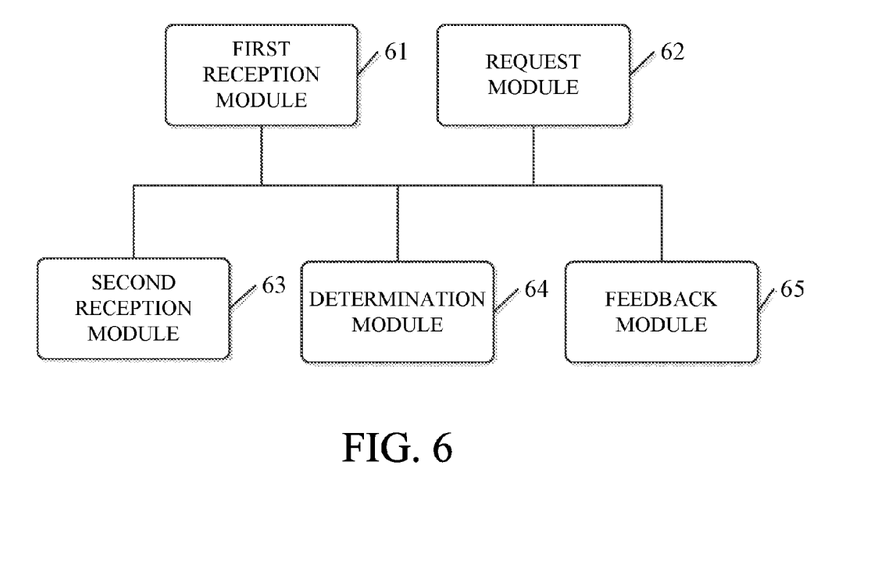
FIG. 6 is a diagram of another example apparatus for providing feedback information according to implementations of this disclosure.

The following figures show example apparatuses according to implementations of this disclosure. The apparatuses can be any computing device that can be used for providing feedback information, such as a wearable device, a remote server computer, a personal computer, a laptop computer, a tablet computer, a cell phone, a personal data assistant (PDA), or a computing service provided by a computing service provider, e.g., a website, and cloud computing. In some implementations, the computing device can include one or more components such as a processing device or a processor, a memory, a storage device, an input device, an output device, a communication device, and one or more modules for specific purposes. The embodiments of the modules 51-53 and 61-65 in this disclosure can be implemented by computer software, hardware, firmware, logic circuits (like ASIC), or their combinations.

FIG. 5 is a diagram of an example apparatus for providing feedback information according to implementations of this disclosure. The apparatus can be a wearable device. As shown in FIG. 5, the apparatus for providing feedback information can include modules 51-53.

Monitor module 51 can be configured to determine a current status of a user.

Reception module 52 can be configured to receive a request for the current status of the user from a first terminal.

Transmission module 53 can be configured to transmit at least one broadcast packet to the first terminal, wherein the at least one broadcast packet can include an identifier of the wearable device and the current status of the user.

In some implementations, monitor module 51 can include the following submodules.

A monitor submodule can be configured to monitor a movement trajectory of the wearable device.

A determination submodule can be configured to determine the current status of the user based on the movement trajectory of the wearable device.

In some implementations, the determination submodule can be further configured to monitor an acceleration of the wearable device with a predetermined frequency and determine the current status of the user based on the monitored acceleration of the wearable device.

In some implementations, transmission module 53 can include the following submodules.

A transmission submodule can be configured to transmit the at least one broadcast packet to the first terminal via Bluetooth, wherein the at least one broadcast packet can include an identification code of the wearable device and a code of the current status of the user.

FIG. 6 is a diagram of another example apparatus for providing feedback information according to implementations of this disclosure. The apparatus can be a first terminal receiving a call from a second terminal. As shown in FIG. 6, the apparatus for providing feedback information can include modules 61-65.

First reception module 61 can be configured to receive data directed to a user associated with the first terminal from a second terminal.

Request module 62 can be configured to transmit a request for a current status of a user to a wearable device.

Second reception module 63 can be configured to receive at least one broadcast packet from the wearable device, wherein the at least one broadcast packet can include an identifier of the wearable device and the current status of the user.

Determination module 64 can be configured to, based on the identifier of the wearable device, determine whether the wearable device has been paired with the first terminal.

Feedback module 65 can be configured to, if the wearable device has been paired with the first terminal, execute at least one feedback operation directed to the second terminal based on the current status of the user.

In some implementations, first reception module 61 can include the following submodules.

A first reception submodule can be configured to receive data associated with a phone call from the second terminal.

A second reception submodule can be configured to receive data associated with a message from the second terminal.

In some implementations, feedback module 65 can include the following submodules.

A determination submodule can be configured to, if the wearable device has been paired with the first terminal, determine whether the current status of the user is indicative of a Do-Not-Disturb (DND) status.

A first indication submodule can be configured to, if the current status of the user is indicative of the DND status and if the data directed to the user associated with the first terminal has been received from the second terminal for a first predetermined number of times, withhold an indication of having received the data directed to the user associated with the first terminal and transmit data indicative of the DND status to the second terminal, wherein the data indicative of the DND status can include data indicative of the current status of the user; if the current status of the user is indicative of the DND status and if the data directed to the user associated with the first terminal has been received from the second terminal for a second predetermined number of times within a predetermined interval, generating the indication of having received the data directed to the user associated with the first terminal.

A second indication submodule can be configured to, if the current status of the user is not indicative of the DND status, transmit the indication of having received the data directed to the user associated with the first terminal to the second terminal.

According to implementations of apparatuses for providing feedback information in this disclosure, a wearable device can determine a current status of a user. In response to receiving data directed to the user associated with the first terminal from a second terminal, a first terminal can transmit a request for the current status of the user to the wearable device; and based on the current status of the user, the first terminal can trigger to execute at least one feedback operation directed to the second terminal. In those implementations, the user can avoid disturbance from the data directed to the user associated with the first terminal, and information can be fed back to the second terminal to indicate the current status of the user, by which user experience can be improved.

Note that, the aforementioned method for providing feedback information according to implementations in this disclosure is described by examples based on functions of the aforementioned modules. In practical applications, the functions can be distributed to be implemented by different functional modules based on needs, i.e., internal structures of apparatuses can be divided into different functional modules purporting to implement the foregoing functions in complete or in part. Moreover, according to implementations in this disclosure, the aforementioned methods and apparatuses for adjusting a game scene share the same conception, the specific processes for implementation of which have been described in foregoing implementations and examples, therefore will not be discussed further hereinafter.

Technical specialists skilled in the art should understand that, the implementations in this disclosure can be implemented as methods, systems, or computer program products. Therefore, this disclosure can be implemented in forms of a complete hardware implementation, a complete software implementation, and a combination of software and hardware implementation. Further, this disclosure can be embodied as a form of one or more computer program products which are embodied as computer executable program codes in computer writable storage media (including but not limited to disk storage and optical storage).

This disclosure is described in accordance with the methods, devices (systems), and flowcharts and/or block diagrams of computer program products of the implementations, which should be comprehended as each flow and/or block of the flowcharts and/or block diagrams implemented by computer program instructions, and the combinations of flows and/or blocks in the flowcharts and/or block diagrams. The computer program instructions therein can be provided to generic computers, special-purpose computers, embedded computers or other processors of programmable data processing devices to produce a machine, wherein the instructions executed by the computers or the other processors of programmable data processing devices produce an apparatus for implementing the functions designated by one or more flows in the flowcharts and/or one or more blocks in the block diagrams.

The computer program instructions can be also stored in a computer readable storage which is able to boot a computer or other programmable data processing device to a specific work mode, wherein the instructions stored in the computer readable storage produce a manufactured product containing the instruction devices which implements the functions designated by one or more flows in the flowcharts and/or one or more blocks in the block diagrams.

The computer program instructions can also be loaded to a computer or another programmable data processing device to execute a series of operating procedures in the computer or the other programmable data processing device to produce a process implemented by the computer, by which the computer program instructions executed in the computer or the other programmable data processing device provide the operating procedures for the functions designated by one or more flows in the flowcharts and/or one or more blocks in the block diagrams.

Apparently, the technical specialists skilled in the art can perform any variation and/or modification to this disclosure by the principles and within the scope of this disclosure. Therefore, if the variations and modifications in this disclosure are within the scope of the claims and other equivalent techniques herein, this disclosure intends to include the variations and modifications thereof.

What is claimed is:

1. A method for providing feedback information, using a first terminal and a user status associated with a wearable device, comprising:
 receiving, from a second terminal, data directed to a user associated with the first terminal;
 transmitting, by the first terminal, a request for a current status of the user to the wearable device;
 receiving, from the wearable device, at least one broadcast packet, wherein the at least one broadcast packet comprises an identifier of the wearable device and the current status of the user;
 based on the identifier of the wearable device, determining whether or not the wearable device has been paired with the first terminal; and
 based on a determination that the wearable device has been paired with the first terminal, executing, at the first terminal, at least one feedback operation directed to the second terminal using the current status of the user.

2. The method of claim 1, wherein the data directed to the user associated with the first terminal comprises data associated with one of a phone call or a message from the second terminal to the first terminal, and wherein the at least one broadcast packet is received via Bluetooth.

3. The method of claim 1, based on a determination that the wearable device has been paired with the first terminal, the executing, at the first terminal, the at least one feedback operation directed to the second terminal using the current status of the user, comprises:
   based on a determination that the wearable device has been paired with the first terminal, determining whether or not the current status of the user is indicative of a Do-Not-Disturb (DND) status;
   based on a determination that the current status of the user is indicative of the DND status and a determination that the data directed to the user associated with the first terminal has been received from the second terminal for a first predetermined number of times:
      withholding an indication of having received the data directed to the user associated with the first terminal; and
      transmitting, to the second terminal, data indicative of the DND status, wherein the data indicative of the DND status comprises data indicative of the current status of the user; and
   based on the determination that the current status of the user is indicative of the DND status and a determination that the data directed to the user associated with the first terminal has been received from the second terminal for a second predetermined number of times within a predetermined interval:
      generating the indication of having received the data directed to the user associated with the first terminal; and
   based on a determination that the current status of the user is not indicative of the DND status, transmitting, to the second terminal, the indication of having received the data directed to the user associated with the first terminal.

4. An apparatus for providing feedback information, using a user status associated with a wearable device, comprising:
   a first reception circuit configured to receive data directed to a user associated with the apparatus from a first terminal;
   a request circuit configured to transmit a request for a current status of the user to the wearable device;
   a second reception circuit configured to receive at least one broadcast packet from the wearable device, wherein the at least one broadcast packet comprises an identifier of the wearable device and the current status of the user;
   a determination circuit configured to, based on the identifier of the wearable device, determine whether or not the wearable device has been paired with the apparatus; and
   a feedback circuit configured to, based on a determination that the wearable device has been paired with the apparatus, execute at least one feedback operation directed to the first terminal using the current status of the user.

5. The apparatus of claim 4, wherein the at least one broadcast packet is received via Bluetooth.

6. The apparatus of claim 4, wherein the first reception circuit comprises:
   a first reception circuit configured to receive data associated with a phone call from the first terminal to the apparatus; and
   a second reception circuit configured to receive data associated with a message from the first terminal to the apparatus.

7. The apparatus of claim 5, wherein the feedback circuit comprises:
   a determination circuit configured to, based on a determination that the wearable device has been paired with the apparatus, determine whether or not the current status of the user is indicative of a Do-Not-Disturb (DND) status;
   a first indication circuit configured to, based on a determination that the current status of the user is indicative of the DND status and a determination that the data directed to the user associated with the apparatus has been received from the first terminal for a first predetermined number of times:
      withhold an indication of having received the data directed to the user associated with the apparatus; and
      transmit, to the first terminal, data indicative of the DND status, wherein the data indicative of the DND status comprises data indicative of the current status of the user; and
   based on the determination the current status of the user is indicative of the DND status and a determination that the data directed to the user associated with the apparatus has been received from the first terminal for a second predetermined number of times within a predetermined interval:
      generate the indication of having received the data directed to the user associated with the apparatus; and
   a second indication circuit configured to, based on a determination that the current status of the user is not indicative of the DND status, transmit, to the first terminal, the indication of having received the data directed to the user associated with the apparatus.

* * * * *